United States Patent [19]

Fuller et al.

[11] Patent Number: 5,539,035
[45] Date of Patent: Jul. 23, 1996

[54] RECYCLABLE WAX-COATED CONTAINERS

[75] Inventors: W. Craig Fuller, Circleville; Teresa M. Krug; William L. Cyrus, Jr., both of Chillicothe; Jyh-Yee Lan, Dublin, all of Ohio

[73] Assignee: The Mead Corporation, Dayton, Ohio

[21] Appl. No.: 322,115

[22] Filed: Oct. 12, 1994

[51] Int. Cl.$^6$ .............................. C08K 5/09; C08K 5/71; C08L 91/06
[52] U.S. Cl. ...................... 524/322; 524/300; 524/478; 524/487; 524/488
[58] Field of Search ......................... 524/300, 322, 524/478, 487, 488, 489, 479, 480

[56] References Cited

U.S. PATENT DOCUMENTS

| | | | |
|---|---|---|---|
| 2,117,199 | 5/1938 | Miller | 524/322 |
| 2,402,903 | 6/1946 | Messey et al. | 428/469 |
| 2,429,150 | 10/1947 | Zimmer | 106/219 |
| 2,456,283 | 12/1948 | Jefferson | 106/268 |
| 2,710,285 | 6/1955 | Trusler | 252/301.32 |
| 2,959,513 | 11/1960 | Savage | 162/6 |
| 3,001,963 | 9/1961 | Higgins | 524/322 |
| 3,023,156 | 2/1962 | Podlipnik | 208/21 |
| 3,211,681 | 10/1965 | Arakawa et al. | 524/489 |
| 3,297,610 | 1/1967 | Moyer | 428/486 |
| 3,417,040 | 12/1968 | Kremer | 524/300 |
| 3,428,591 | 2/1969 | Lewis | 524/478 |
| 3,431,162 | 3/1969 | Morris | 428/182 |
| 3,467,547 | 9/1969 | Harvey et al. | 428/182 |
| 3,491,043 | 1/1970 | Zmitrovis | 524/322 |
| 3,520,842 | 7/1970 | Crean | 524/489 |
| 3,629,171 | 12/1971 | Kremer et al. | 524/489 |
| 3,653,958 | 4/1972 | Kohn et al. | 427/442 |
| 3,672,944 | 7/1972 | Thompson et al. | 524/322 |
| 3,849,246 | 11/1974 | Raymond et al. | 162/4 |
| 3,891,497 | 6/1975 | Daane et al. | 162/6 |
| 3,892,613 | 7/1975 | McDonald | 156/210 |
| 3,919,149 | 11/1975 | Cushman et al. | 524/111 |
| 3,950,280 | 4/1976 | Simpleton | 524/322 |
| 3,962,509 | 6/1974 | Thompson | 428/182 |
| 3,967,024 | 6/1976 | Beath et al. | 428/155 |
| 4,017,016 | 4/1977 | Ivy | 229/23 BT |
| 4,020,228 | 4/1977 | Eastes | 524/300 |
| 4,117,199 | 9/1978 | Gotoh et al. | 428/486 |
| 4,126,225 | 11/1978 | Hyland et al. | 229/244 |
| 4,180,490 | 12/1979 | Maclean | 524/322 |
| 4,339,276 | 7/1982 | Yokoyama et al. | 106/271 |
| 4,464,499 | 8/1984 | Umemoto et al. | 524/230 |
| 4,523,956 | 6/1985 | Thurlow | 106/243 |
| 4,762,816 | 8/1988 | Tamagawa et al. | 503/200 |
| 4,826,714 | 5/1989 | King | 428/34.2 |
| 4,948,033 | 8/1990 | Halsell et al. | 229/23 R |
| 5,084,135 | 1/1992 | Brooks et al. | 162/4 |
| 5,169,891 | 12/1992 | Brown | 524/322 |
| 5,188,867 | 2/1993 | Chu et al. | 427/173 |
| 5,271,805 | 12/1993 | Stockel et al. | 162/4 |
| 5,294,363 | 3/1994 | Schwartz et al. | 252/108 |
| 5,391,316 | 2/1995 | Garrett et al. | 252/126 |

FOREIGN PATENT DOCUMENTS

| | | |
|---|---|---|
| 0610101 | 8/1994 | European Pat. Off. . |
| 207632 | 3/1984 | Germany . |
| 0054577 | 4/1980 | Japan .................... 524/300 |
| 0155253 | 9/1982 | Japan .................... 524/478 |
| 0091143 | 5/1984 | Japan .................... 524/322 |
| 0157161 | 9/1984 | Japan .................... 524/322 |
| 0064740 | 4/1986 | Japan .................... 524/322 |
| 0709656 | 1/1980 | U.S.S.R. .............. 524/487 |
| 1502599 | 3/1978 | United Kingdom . |
| 91/05107 | 4/1991 | WIPO . |

OTHER PUBLICATIONS

Report on Projects Undertaken by a Consortium, Companies, Jan. 31, 1992.
Swedes Research Waxed Containers, Paper Recycler/May 1992, p. 10.
Recycling Waxes, PPI, p. 6 (1992).
Encyclopedia of Polymer Science and Engineering, vol. 17, John Wiley & Sons, 1989, New York, pp. 784–795.
Paper Film and Fiol Converter "Waxes for Converting", Paraffin Waxes—Part I, 1955, pp. 24–27.
The Condensed Chemical Dictionary, 8th Ed., Van Nostrand Reinhold Company, New York, 1971, p. 904.
CRC Handbook of Chemistry and Physics, 65th Ed., 1984–1985, CRC Press, Inc., Boca Raton, Fl, p. C-280.

*Primary Examiner*—Peter A. Szekely
*Attorney, Agent, or Firm*—Tsugihiko Suzuki

[57] ABSTRACT

A wax composition for coating paper products is disclosed. The wax composition contains a wax base and a polymeric additive. The wax base comprises a paraffin wax and a fatty acid. The polymeric additive is a polymeric amorphous substance soluble in or miscible with the wax base.

17 Claims, No Drawings

RECYCLABLE WAX-COATED CONTAINERS

BACKGROUND OF THE INVENTION

The invention is directed to an improved wax composition which can be coated on paper products and which makes the paper products recyclable under standard repulping condition in a hydropulper without significantly increasing the repulping temperature or pH. The invention is also directed to a wax-coated paper product which is capable of being recycled under standard repulping conditions.

Wax-coated paper products, particularly wax-coated corrugated paperboard containers have been used for years to ship and store fresh, perishable foods such as poultry, fish and meat. Typically, the containers are packed with crushed ice to keep the food cool during shipping and storage. The wax imparts water and moisture resistance to the containers.

Examples of wax-coated or wax-impregnated paperboard containers are described in U.S. Pat. Nos. 3,892,613 to McDonald et al.; 4,017,016 to Ivy; 4,126,225 to Hyland et al.; and 4,948,033 to Halsell, II et al. As shown in Halsell, II et al., the paperboard may be impregnated with about 6 pounds per 1,000 square feet of a wax blend and then curtain coated with an additional 6.5 pounds per 1,000 square feet of wax blend.

Currently, wax-coated containers are not recycled for several reasons. In view of the large quantity of wax-coated containers which are used each year, it would be highly desirable to recycle the containers rather than to simply discard them. The reclamation of waste paper has been the subject of various patents and studies. For example, U.S. Pat. Nos. 3,440,134 to Murphy, Jr., 4,347,009 to DeCuester et al.; 4,548,674 to Hageman wt al.; and 4,737,238 to deRuvo, are related to methods for pulping waste paper and, particularly, used corrugated containers.

Several problems are inherent in recycling wax-coated containers. First, the purpose of the wax is to impart water and moisture resistance to the container and this property directly interferes with the essential property required in a recyclable container, namely, repulpability. Hence, it is necessary to remove the wax coating in the recycling process. Second, in removing the wax coating, a wax residue may remain on or contaminate the paper fibers. This residue weakens the strength of the recycled sheet because it prevents or reduces the amount of interfiber bonding such as hydrogen bonding which can be achieved in the sheet. Third, due to the high melting points of many of the waxes conventionally used on wax-coated containers, in order to remove the coating, it is necessary to modify the industry standard repulping conditions to use higher repulping temperatures. This can lead to increased energy costs which detracts from the profitability of recycling.

Presently used corrugated container boards are received at the pulping station in large bales. As a result of the difficulties involved in repulping wax-coated containers, if an inspection of the bales reveals the presence of an excessive amount of wax-containing board, the entire bale is discarded rather than repulped. While this may not represent a serious economic loss, it is certainly an important environmental concern.

In order to recycle wax-coated containers, it would be desirable to design a wax coating which can be cleanly removed from the containerboard under conventional or industry standard repulping conditions of temperature and pH. Aluminum soaps have been proposed as a substitute for wax in recyclable wax-coated containers for this purpose, and the use of aluminum soaps in combination with fatty acids has also been considered. However, a hot dispersion technique and an alkaline pH are required to remove these coatings and there remains a need for a coating which is compatible with industry practice.

SUMMARY OF THE INVENTION

In meeting the foregoing needs, the present invention provides a wax composition which comprises a wax base and a polymeric additive. The wax base contains a paraffin wax and a fatty acid. It is preferred that the paraffin wax has a melting point of about 130° to 160° F. and viscosity of 10 to 200 cps at 10° F. above its melting point. A preferred fatty acid have about 8 to 22 carbon atoms. The polymeric additive is a polymeric amorphous substance compatible with the wax base.

The wax base may additionally contain a microcrystalline wax. A preferred microcrystalline wax melts at a temperature less than about 180° F. and preferably less than about 160° F. The composition containing the microcrystalline wax is characterized as having a melting point of about 140° F., a viscosity of about 20 to 800 cps and preferably about 100 to 300 cps at 240° F.

The wax composition of the invention is desirable for use in making wax-coated paper products such as wax-coated corrugated board container for three reasons in particular. First, it can be removed from the basestock in a hydropulper under standard operating procedures such that the fiber in the basestock can be recycled. Second, it can form a coating which is resistant to both water and grease when coated on paper products. Third, it can create a physically tough and flexible coating firmly adhered to basestock which coating is capable of retaining its integrity during and after paper folding process.

The invention also provides a paper product which is coated with the above wax composition. The wax-coated paper product of the present invention can be repulped using a hydropulper at a temperature greater than about 140° F. and preferably about 140° to 145° F. and pH equal to or greater than about 6.5 and preferably about 7. Because the coated wax can be easily removed from the basestock under standard repulping procedures such as mentioned above, the paper product of the invention when recycled yields a recycled paper product which exhibits good physical strength.

The invention further provides a method of recycling the above-mentioned wax-coated paper product.

The invention further provides a process of using a wax composition containing a paraffin wax and a fatty acid. The process comprises coating a paper basestock with the wax composition to provide a wax-coated paper product, and repulping the paper product in a hydropulper. The repulping step comprises converting the fatty acid in the coating into a soap in the presence of an alkali or emulsifying the paraffin wax by means of the soap and thereby removing the paraffin wax from the paper basestock. The wax composition may contain about 80 to 99% by weight of a wax base which comprises the paraffin wax and the fatty acid. The concentration of the paraffin wax in the wax base may be greater than 50% by weight, and the concentration of the fatty acid in the wax base may be no more than 30% by weight. The wax base may further comprise a microcrystalline wax, and the emulsifying step may comprise emulsifying the microcrystalline wax by means of the soap and thereby removing the microcrystalline wax from the paper basestock.

Accordingly, it is a principal object of the present invention to provide a wax composition for coating paper products such as paperboard containers and, more particularly, corrugated paperboard containers, and which is compatible with industry standard recycling procedures.

Another object of the present invention is to provide a wax composition for coating paper products to form a wax coating which exhibits, when coated on basestocks, good surface-protecting properties including water resistance, grease resistance, adhesion strength to the basestocks, mechanical toughness and flexibility.

It is a further object of the present invention to provide a wax-coated paper product which is compatible with industry standard recycling procedures and which yields a recycled paper product which exhibits good physical strength.

It is a further object of the present invention to provide a method of recycling a paper product coated with a wax composition, which method can yield a recycled paper product of good physical strength.

Other objects and advantages of the invention will become apparent from the following description and the appended claims.

DETAILED DESCRIPTION OF THE PREFERRED EMBODIMENT

The present invention is principally directed to wax-coated containers prepared from paperboard or corrugated board. However, those skilled in the art will appreciate that the invention may be useful in preparing any wax-coated paper product where ease of recyclability is desired including milk containers. The containers of the invention are desired primarily for use in shipping and storing perishable food items such as poultry, meat and fish. The containers of the present invention are conventional with the exception of the wax coating.

The wax coating used in the invention is formed from a wax composition which incorporates a repulpable wax base and a polymeric additive. The wax base useful in the invention is disclosed in U.S. patent application Ser. Nos. 08/014,198 and 08/152584 which are owned by the assignee of the invention and which are hereby incorporated by reference. A preferred embodiment of the wax base contains a paraffin (macrocrystalline) wax, a microcrystalline wax and a fatty acid. However, as an alternative, the wax base containing no microcrystalline wax but a paraffin wax and a fatty acid may be used. These components of the wax base and the polymeric additive will be described one by one hereinbelow.

The paraffin wax useful in the invention has a melting point of about 130° to 160° F. and preferably about 140° F., a viscosity of about 10 to 200 cps and preferably about 20 cps at 10° F. above the melting point and is preferably ash-free, i.e., contains little or no fillers. The paraffin wax preferably comprises but not limited to a mixture of paraffins ranging from about 20 to 45 carbon atoms and preferably about 20 to 40 carbon atoms with at least about 60 wt. % of the mixture containing waxes having about 25 to 32 carbon atoms and more preferably 26 to 30 carbon atoms. Suitable paraffin waxes include Ecco Wax 244 commercially available from Eastern Color and Chemical Company, Providence, R.I., and Boler Wax 1977. A particularly preferred wax is Ecco Wax 244.

The second component of the wax base, i.e., the microcrystalline wax, is flexible and melts at a temperature less than about 180° F. This wax is selected such that it is mutually soluble or miscible with the paraffin wax and compatible with the temperature used in the hydropulper. The microcrystalline wax used in the preferred embodiment has a wide melting-point range from about 85° F. to 160° F. Preferably, less than about 15% of the microcrystalline wax, still more preferably less than about 10% and most preferably less than about 5–6% of the microcrystalline wax melts at a temperature less than about 100° F. If the microcrystalline wax contains substantially higher amounts of these low melting-point components, blocking may occur. The microcrystalline wax may be further characterized in that less than about 10% and preferably less than about 4–5% of the microcrystalline wax has a melting point greater than about 150° F. If the microcrystalline wax contains substantially higher amounts of these high melting-point components, it may be difficult for the wax coating to be emulsified during the repulping of the paperboard product in the hydropulper. Most preferably, about 75% to 90% of the microcrystalline wax has a melting point in the range of about 100° F. to 150° F. One example of a useful microcrystalline wax is Bowax 1018 commercially available from International Group Inc. Other microcrystalline waxes which melt in about the same temperature range as the paraffin wax described above should also be useful in the present invention.

The third component, the fatty acid, may be a saturated or unsaturated fatty acid and preferably comprises a fatty acid having about 8 to 22 carbon atoms. Examples of the fatty acids useful in the invention include stearic acid, palmitic acid, myristic acid, lauric acid, capric acid, caprylic acid, arachidic acid, behenic acid, oleic acid, linoleic acid, etc. Preferred fatty acids include stearic acid, palmitic acid and myristic acid. The most preferred fatty acid is stearic acid.

The amount of the fatty acid will vary with the amount of water resistance desired in the product and its repulpability. The upper limit on the amount of fatty acid contained in the wax composition is dependent upon the water resistance desired for the wax coating. As the concentration of the fatty acid increases, the water resistance of the wax coating tends to be reduced. The repulpable wax base with the microcrystalline wax preferably contains up to about 30% fatty acid, more preferably about 5 to 20% and most preferably about 10%. The wax base without the microcrystalline wax preferably contains up to about 30% fatty acid, more preferably about 10 to 25% and most preferably 10 to 20%.

The fatty acid is believed to function as a wax compatible soap precursor which forms a salt of the fatty acid upon the addition of a base such as an alkali or alkaline earth metal hydroxide or salt to adjust the pH during the repulping of the paper products (e.g., corrugated paperboard containers) in the hydropulper. It is theorized that some of the wax used in carrying out the invention when used in conjunction with the fatty acid during repulping produces small wax particles which become interspersed among the fibers and acts as an internal sizing agent in the recycled sheet. It is further theorized that other conventional waxes which fall outside the above characterization description provide larger particles which may interfere with fiber-to-fiber bonding or hydrogen bonding and therefore reduce the strength of the repulped product.

The polymeric additive, the fourth component of the wax composition, is a polymeric amorphous substance soluble in or miscible with the paraffin wax and/or the microcrystalline wax. Preferably, it is hydrophobic in nature and can be dissolved in the wax base mentioned above. It is further preferred that the polymeric additive and the amount thereof is such that they allow a paper product having the wax coating thereon to be repulped during the normal recycling procedure. For example, in order for such a paper product to be recyclable, it is preferred that the polymeric additive forms neutral uncharged particles in emulsions. Charged particles would be deposited on the metal screens for screening pulp solutions and would thereby interfere with the screening process.

Examples of polymeric additives useful in the invention includes an ethylene propylene diene methylene (EPDM) rubber such as Vistalon 3708 commercially available from Exxon, a hydrocarbon resin such as Escorez 1304 commercially available from Exxon, an ethylene-vinyl acetate copolymer such as Escorene UL 7765 commercially available from Exxon, an ethylene-methyl acrylate copolymer such as Optema TC140 commercially available from Exxon, an ethylenepropylene rubber (EPR) such as Polysar 306 commercially available from Miles/Polysar and Vistalon 404 commercially available from Exxon, and a butyl rubber such as Butyl Rubber 065 commercially available from Exxon. Preferred polymeric additives include an EPDM rubber and an EPR. The most preferable polymeric additive is an EPDM rubber. These additives each may be used alone in the wax composition or they may be used in combination. Preferred combinations include a combination of an EPDM rubber and a hydrocarbon resin, a combination of an ethylene-vinyl acetate copolymer and a hydrocarbon resin and a combination of an ethylenemethyl acrylate copolymer and a hydrocarbon resin.

The polymeric additive improves the physical properties of the wax coating such as the mechanical toughness, the flexibility, the grease resistance and the water resistance. The increase in flexibility and toughness is believed to be caused by reinforcing networks formed by the additive. It may be theorized that the amorphous additive breaks up the crystalline structure of the wax coating and entangles the wax molecules to form such reinforcing networks. The increase in grease resistance may be simply explained by the general fact that higher molecular weight is essentially not compatible with greases. The polymeric additive is of a high molecular weight as compared to the wax. However, the increase in grease resistance as well as in water resistance may be the result of the improvement of the mechanical strength of the coating. It can be explained that the increase in flexibility and toughness inhibits micro damages such as rupture, crack, wear, scrape and the like from developing in the wax coating, which micro damages tend to allow grease or water to penetrate to the basestock.

The amount of the polymeric additive will vary with the amount of water and grease resistance desired in the coating as well as the amount of repulpability desired in the paper product. The upper limit on the amount of the additive contained in the wax composition is dependent upon the repulpability desired whereas the lower limit on the same is dependent on the water and grease resistance desired. As the concentration of the additive increases the repulpability tends to be reduced. On the other hand, as the concentration of the additive decreases, the water and grease resistance tends to be reduced. The viscosity of the wax composition is also a function of the concentration of the additive. As the concentration of the additive increases, the viscosity of the wax composition increases. An excess amount of the additive may result in difficulty in forming a coating and poor adhesion to the basestock. For most applications, the wax composition may contain about 1 to 20% polymeric additive and preferably about 2 to 10%. For a higher molecular weight additive such as an EPDM rubber and an EPR, the most preferred concentration is about 7%.

It has been found that the particular wax material present in the highest concentration in the composition dictates the melting point of the composition. For example, in a composition containing 4 to 7% Vistalon 3708 and 93 to 96% wax base which consists of 60% Ecco wax 244 having a melting point of about 140° F., 30% Bowax 1018 having a melting point of about 160° F. and 10% stearic acid, the observed melting point of the composition is at or near 140° F., i.e., the melting point of the Ecco wax which is present in the composition at the higher concentration. It is believed that the wax present in the highest concentration may behave as a solvent for the wax or other components present in the lesser concentration and that the melting point of the composition is determined similar to the melting point of other solutions as contrasted with other mixtures which yield melting points which are closer to the average melting point of the constituents.

In formulating the wax base with the microcrystalline wax, the paraffin wax will be present in an amount greater than the amount of the microcrystalline wax. Typically, the paraffin wax is present in the wax base in an amount greater than 50%, preferably about 55 to 60% and most preferably about 60%. A highly preferred wax base is one which contains about 60% Ecco wax 244, 25 to 35% Bowax 1018 and 5 to 15% stearic acid. A highly preferred wax composition is one which contains 90 to 98% wax base having the formulation mentioned above and 2 to 10% Vistalon 3708 or 2 to 10% Vistalon 404.

In the wax base without the microcrystalline wax, the paraffin wax is typically present in an amount greater than 70%, preferably about 75 to 90% and most preferably about 80 to 90%. A highly preferred wax base is one which contains about 80% Ecco wax 244 and 20% stearic acid. A highly preferred wax composition using this wax base is one which contains 90 to 98% wax base and 2 to 10% Vistalon 3708 or 2 to 10% Vistalon 404.

The containers of the present invention are typically corrugated paperboard made up of two sheets of liner board having a corrugated media sandwiched therebetween. In preparing a wax coated container of the invention, the corrugated media is usually impregnated with the wax composition of the invention by immersing the media in a bath of the melted wax. However, the corrugated media may be impregnated with the wax base, i.e., the wax composition having no polymeric additive. One or both sides of a corrugated board are coated with the wax composition by means of either a curtain coater or a spray coater. Curtain coating may be more convenient for most of wax-coated paper product plants than spray coating since curtain coaters have been a typical means for wax application previously. However, spray coating may enable coating of both sides of the basestock simultaneously and also enable the use of lesser amount of the coating thereby providing an economical advantage over curtain coating in the long run. Spray coating is suitable for those compositions having a lower viscosity than the compositions suitable for curtain coating. Depending on the desired coating method, the viscosity of the wax composition may be adjusted by varying the concentration of the polymeric additive. However, the viscosity of the wax composition may be increased by adding a viscosity modifier other than the polymeric additives.

Typically, the wax-containing composition is applied on one side of a corrugated board at an average amount of about 4 to 8 pounds per 1,000 square feet. More precisely, the corrugated media is impregnated with the wax composition at a coat weight of about 3 to 5 pounds per 1,000 square feet and each liner sheet is generally coated with the wax composition at a coat weight of about 4 to 8 pounds per side per 1,000 square feet. The coat weight is typically a function of a cost versus water-resistance balance.

The wax composition of the present invention used in coating paper products (e.g., corrugated board containers) is especially attractive because, unlike prior waxes, it allows the wax-coated paper products to be recycled using a hydropulper at standard pulping condition which include a temperature of about 130° to 160° F. and a neutral or alkaline pH (e.g., greater than about 6.5). Any alkaline pH can be used to repulp the paper products, however, for compatibility with industrial operations, a pH of less than about 9.0 is preferred and a pH of less than about 8.0 is most preferred. Excellent results have been achieved with a wax composition consisting of Ecco wax 244, Bowax 1018, stearic acid and Vistalon 3708 and coated on corrugated board containers when such wax-coated containers were repulped at pH of 6.5 to 7.0. Removal of the wax is evident when the repulping water turns milky.

The wax composition of the invention used in coating corrugated board containers is also attractive because the composition provides the containers with good resistance to both grease and water. Such corrugated board containers are particularly suitable for accommodating fresh perishable foods.

The invention is illustrated in more detail by the following non-limiting examples.

EXAMPLE 1

Nine corrugated board containers were prepared and coated, by hand draw down, respectively with the following compositions: (1) 100% EBF631 (i.e., a repulpable wax base containing 60% Ecco wax, 30% Bowax and 10% stearic acid), (2) a non-repulpable curtain coating wax commercially available from Citgo or Conoco, (3) 95% EBF631 and 5% Vistalon 3708, (4) 90% EBF631 and 10% Vistalon 3708, (5) 90% EBF631, 5% Vistalon 3708 and 5% Escorez 1304, (6) 85% EBF631, 10% Vistalon 3708 and 5% Escorez 1304, (7) 90% EBF631, 5% DE291 and 5% Escorez 1304, (8) 90% EBF631 and 10% Escorene UL7765, and (9) 85% EBF631, 10% TC140 and 5% Escorez 1304. As will be readily understood, Compositions 3 to 9 are the wax compositions according to the invention whereas Compositions 1 and 2 are the comparative examples. The compositions were allowed to set, and then the containers were loaded with cold chickens. After that, the containers were shaken using a laboratory platform shaker for about 48 hours and then evaluated for the properties shown in Table 1.

"Grease Resistance" was evaluated by visually inspecting the inside surfaces of the containers for grease spots. The larger the size or the number of the observed grease spot(s) was, the smaller the number of "+" shown in Table 1 is. The rating "0" was given to Composition 1 (repulpable wax base) and it was used as a basis for evaluating the other compositions.

"Whiting" represents the adhesion strength of the coated compositions (i.e. coatings) and it was evaluated by visually inspecting the inside surfaces of the containers for white spots caused by air brought into underneath the coating. The larger the size or the number of the observed white spot(s) was, the smaller the number of "+" shown in Table 1 is. The rating "0" was given to Composition 1 and it was used as a basis for evaluating the other compositions.

"Sogginess" represents the water resistance or structural integrity of the coated compositions and it was evaluated by bending and pressing on the containers to see how hard or soft they were. The softer and easier to bend the container was, the smaller the number of "+" shown in Table 1 is. The rating "0" was given to Composition 1 and it was used as a basis for evaluating the other compositions.

As apparent from Table 1, Compositions 3, 5, 6 and 7, i.e., the majority of the compositions according to the invention, demonstrated the surface-protecting capabilities substantially equal to or better than those of Composition 2, i.e., a conventional non-repulpable wax composition. The surface-protecting capabilities of Compositions 8 and 9 are also in an acceptable range.

TABLE 1

| Composition | Test | | |
|---|---|---|---|
| | Grease Resistance | Whiting | Sogginess |
| 1 | 0 | 0 | 0 |
| 2 | ++ | ++ | ++ |
| 3 | ++ | ++ | ++ |
| 4 | + | + | + |
| 5 | ++ | +++ | ++ |
| 6 | ++ | ++ | ++ |
| 7 | ++ | ++ | ++ |
| 8 | ++ | + | + |
| 9 | + | + | + |

EXAMPLE 2

Nine containers coated respectively with the above-mentioned nine different compositions each was repulped separately under standard repulping conditions in a laboratory pulper. Hand sheets were made out of the pulp solution prepared from each container and they were heated so that wax residue if any on the sheets melts and turns visible. The compositions were then evaluated for the properties shown in Table 2.

"Pulper" represents the repulpability or pulper compatibility of the containers, and it was evaluated by visually inspecting the inside surfaces of the pulper for wax and pulp deposit. The thicker the observed deposit was, the larger the given number in Table 2 is. The rating "0" which indicates no deposit was given to Composition 1 and it was used as a basis for evaluating the other compositions.

"Crude" represents the recyclability of the container, and it was evaluated by visually inspecting the hand sheet made out of unscreened pulp solution for wax spots. The larger the size or the number of the observed wax spot(s) was, the larger the given number in Table 2 is. The rating "0" was given to Composition 1 and it was used as a basis for evaluating the other compositions.

"Screened" also represents the recyclability of the container, and it was evaluated by visually inspecting the hand sheet made out of screened pulp solution for wax spots. The larger the size or the number of the observed wax spot(s) was, the larger the given number in Table 2 is. The rating "0" was given to Composition 1 and it was used as a basis for evaluating the other compositions.

As apparent from Table 2, the containers with Compositions 3–9, i.e., all the containers according to the invention, demonstrated the recyclabilities remarkably superior than those of the container with Composition 2, i.e., a conventional non-repulpable wax composition.

TABLE 2

| Composition | Test | | |
| --- | --- | --- | --- |
| | Pulper | Crude | Screened |
| 1 | 0 | 0 | 0 |
| 2 | 5 | 5 | 3 |
| 3 | 0–1 | 1 | 0 |
| 4 | 0–1 | 1 | 0 |
| 5 | 0–1 | 1 | 0 |
| 6 | 0–1 | 0 | 0 |
| 7 | 0–1 | 0 | 0 |
| 8 | 0 | 0 | 0 |
| 9 | 0–1 | 1 | 0 |

What is claimed is:

1. A wax composition for coating paper product, comprising about 80 to 99% by weight of a wax base and about 1 to 20% by weight of a polymeric additive, said wax base comprising greater than 50% by weight of a paraffin wax and no more that 30% by weight of a fatty acid, said polymeric additive comprising a polymeric amorphous substance compatible with said wax base and being selected from the group consisting of an ethylene propylene diene methylene rubber and an ethylene-propylene rubber.

2. The wax composition of claim 1, wherein said wax base comprises about 75 to 90% by weight of said paraffin wax and about 10 to 25% by weight of said fatty acid.

3. The wax composition of claim 2, wherein said wax base comprises about 80 to 90% by weight of said paraffin wax and about 10 to 20% by weight of said fatty acid.

4. The wax composition of claim 1, wherein said paraffin wax has a melting point of about 130° F. to 160° F. and a viscosity of about 10 to 200 cps at 10° F. above the melting point of said paraffin wax.

5. The wax composition of claim 4, wherein said fatty acid has about 8 to 22 carbon atoms.

6. The wax composition of claim 1, wherein said wax base further comprises a microcrystalline wax.

7. The wax composition of claim 6, wherein said wax base comprises about 55 to 60% by weight of said paraffin wax, about 25 to 35% by weight of said microcrystalline wax, and about 5 to 15% by weight of said fatty acid.

8. The wax composition of claim 6, wherein said paraffin wax has a melting point of about 130° F. to 160° F. and a viscosity of about 10 to 200 cps at 10° F. above the melting point of said paraffin wax.

9. The wax composition of claim 8, wherein said fatty acid has about 8 to 22 carbon atoms.

10. The wax composition of claim 9, wherein said microcrystalline wax has a melting point at a temperature less than about 180° F.

11. The wax composition of claim 10, wherein said paraffin wax is a mixture of paraffins ranging from about 20 to 45 carbon atoms with at least about 60% of said paraffins ranging from about 26 to 32 carbon atoms.

12. The wax composition of claim 11, wherein said paraffin wax has a melting point of about 140° F. and a viscosity of about 20 cps at 10° F. above its melting point.

13. The wax composition of claim 10, wherein said fatty acid is selected from the group consisting of stearic acid, palmitic acid and myristic acid.

14. The wax composition of claim 10, wherein said microcrystalline wax has a melting point range of 85° to 160° F. and less than about 15% of said microcrystalline wax melts at a temperature less than about 100° F.

15. The wax composition of claim 14, wherein about 75% to 90% of said microcrystalline wax has a melting point in the range of about 100° F. to 150° F.

16. The wax composition of claim 6, wherein said wax composition has a viscosity of about 20 to 800 cps at 240° F.

17. The wax composition of claim 16, wherein said wax composition has a viscosity of about 100 to 300 cps at 240° F.

\* \* \* \* \*